Sept. 23, 1969     C. E. PAULETTA     3,468,634

CONCENTRIC TUBE ODOR ELIMINATOR

Filed March 23, 1966

INVENTOR.
Carl E. Pauletta
BY Wayne Lang
AGENT

United States Patent Office 3,468,634
Patented Sept. 23, 1969

3,468,634
CONCENTRIC TUBE ODOR ELIMINATOR
Carl E. Pauletta, Wellsville, N.Y., assignor to The Air Preheater Company, Inc., New York, N.Y., a corporation of Delaware
Filed Mar. 23, 1966, Ser. No. 536,835
Int. Cl. B01j 9/16; F27b 15/00
U.S. Cl. 23—288                                    9 Claims

ABSTRACT OF THE DISCLOSURE

A fume incinerator for thoroughly mixing a waste gas stream having a quantity of obnoxious fumes therein with the flame of a burner whereby all portions of the waste gas stream are directed into intimate contact with the flame so as to reduce the obnoxious ingredients thereof to an innocuous state. The device includes a concentric-tubes heat exchanger providing axial countercurrent flow of the waste gas and combustion products.

---

Figure 1:
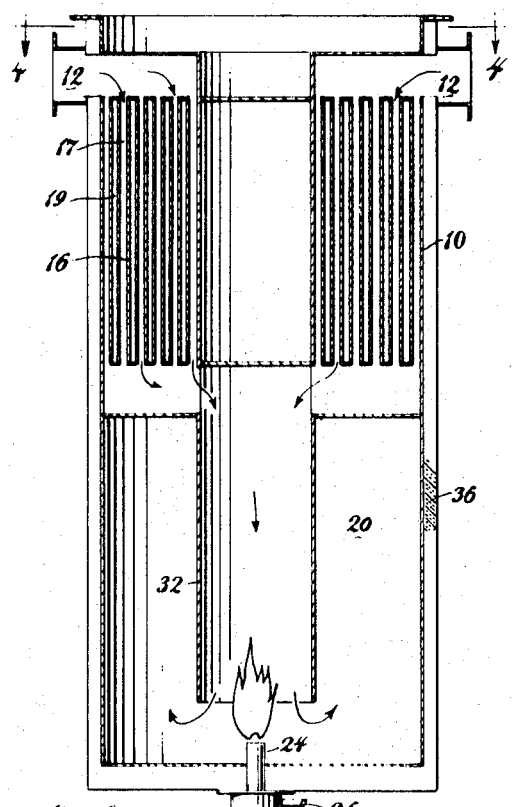

This invention relates to incinerator apparatus used to dissipate or effect removal of odors from gas by heating the gas to a predetermined elevated temperature.

The presence of noxious constituents including vapors in gases exhausting from various industrial processes frequently creates a public nuisance, especially when such gases are exhausted directly to the atmosphere. Not only is the odor of the noxious gases offensive but they may be physically harmful to life and property.

It has been discovered that in many instances the objectionable characteristic of these gases is due to the presence therein of combustible or reactive constituents, and that such constituents may frequently be dissipated entirely by heating the gases to an elevated temperature at which they are more completely oxidized or otherwise transformed to a benign state.

Inasmuch as the temperature required to dissipate the odors may lie in the range of 800° F to 1500° F., it is apparent that the broad use of this process depends upon the efficiency with which the process may be effected and the economic justification of the process involved.

It therefore becomes a primary object of this invention to provide apparatus which will effectively dissipate the noxious fumes contained in exhaust gases from boiler furnaces or from any of various industrial processing operations.

Another object of this invention is to provide an arrangement of apparatus for the elimination of noxious odors that is efficient in operation and economical to manufacture and operate.

A still further object of this invention is to provide an arrangement of apparatus for the elimination of noxious fumes that may occupy a single compact housing.

Figure 2:
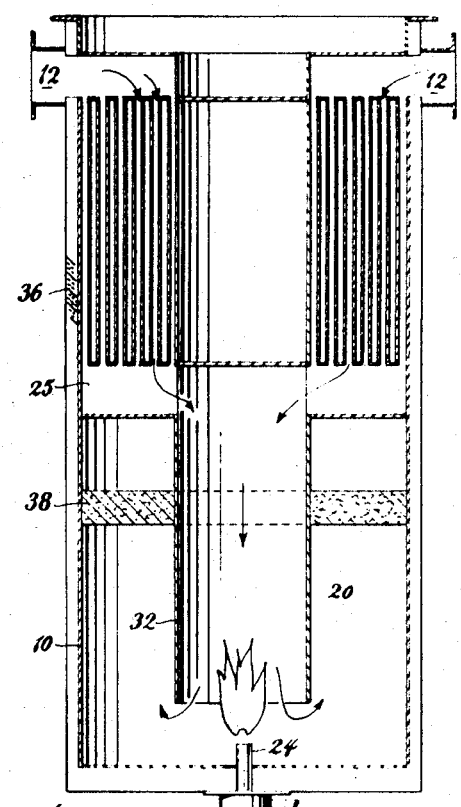
Figure 3:
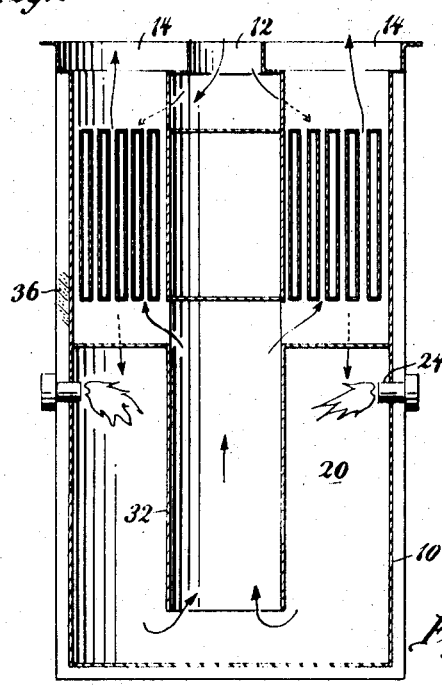
Figure 4:
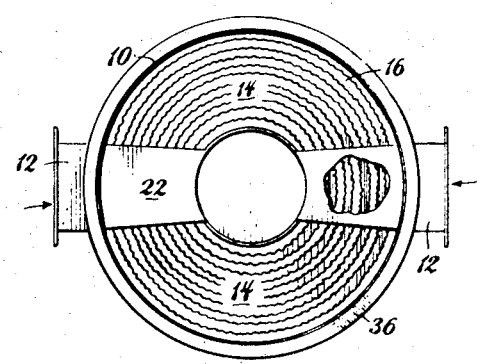

For a more thorough understanding of the invention with reference to the manner by which the aforesaid objects are achieved reference may be had to the drawing in which:

FIGURE 1 is an elevational view in section of a fume eliminator according to this invention, FIGURE 2 shows a modification of the form shown in FIGURE 1 in which a catalyst bed is provided, FIGURE 3 shows a further modification of the original form in which the direction of fluid flow is reversed, and FIGURE 4 is a cross-sectional view of the device as seen from line 4—4 of FIGURE 1.

In the drawings the numeral 10 designates a housing structure having an outlet port 12 for the entrance of a noxious gas and an outlet port 14 for the exhaust therefrom of a relatively pure odor-free gas. Within the housing are located a series of concentric tubular members 16 spaced apart one from the other to provide therebetween inlet and outlet passageways 17 and 19 which are connected respectively to the inlet and outlet ports by means of a manifold connection 22.

A heating means 24 generally taking the form of a combustor having an outside source of fuel 26 is positioned within the combustion zone 20 of the housing 10 at the end thereof axially spaced from the inlet and outlet ports. The heating means may otherwise take the form of an electric heater capable of maintaining a predetermined temperature of from 800° F. to 1500° F. at which the odor may be either oxidized or chemically transformed to an innocuous state.

Dependent upon the type of gas to be acted upon, the heating means may be provided with a gas burner whose oxygen for combustion comes from the gaseous medium having ingress through the inlet port 12 or supplied along with the fuel from an outside source not here shown.

The heating means 24 is preferably positioned closely adjacent the ends of the inlet passageways formed by the concentric tubular members 16 in order that the residence time of the gases traversing the high temperature combustion zone 20 be maintained at or near maximum for sufficient time to completely react with the noxious gases passing therethrough. To further increase the residence time of the noxious gases in the high temperature zone adjacent the heater 24, a baffle or series of baffles 32 may be used so that gases passing through the combustion zone must necessarily flow for an increased period of time before they are directed to the outlet passageway for exhaust to the outlet port.

To further insure that the temperature of the gas within the apparatus is maintained at or near maximum levels, the apparatus may be covered internally or externally with a coating of suitable insulation material 36 that precludes excessive heat loss through the walls of housing 10.

A somewhat modified form of the invention is shown in FIGURE 2 wherein a catalyst 38 of suitable form is positioned in the combustion chamber 20 adjacent the outlet duct for the heated gaseous fluid. The catalyst 38 being exothermic gives off heat during the reaction and thus increases the temperature of the gases passing therethrough to further effect complete dissipation of the noxious gases. Dependent upon the chemical constituency of the noxious odors in the gas and the catalyst involved, the catalyst may further bring about a chemical reaction which still further minimizes the effect of the noxious gas in the gases passing therethrough.

In order that heat may be transferred more readily between fluids flowing through the inlet and outlet passageways, the walls of the concentric tubes 16 are preferably formed with an extended surface which improves their capacity in this respect. Thus the walls of said tubes may be undulated in the manner shown by FIGURE 4 or else they may be given any other configuration deemed of special value.

Inasmuch as the housing is suspended from support means on a single plane and since the heat exchange means is further suspended within the housing, there is little or no problem regarding thermal expansion and contraction of the several parts, and any thermal expansion and contraction that does occur is harmlessly contained within the suspended housing.

In operation, waste gases including a noxious gas to be incinerated enter the apparatus through the plenum and are distributed across the concentric tube core of the heat exchanger by a manifold arrangement 22. The gases are then directed downwardly into the spaces between the tubes 16 and at the bottom of the heat exchanger are directed into an outlet manifold means 25 and central baffle tube 32. The now heated gases continue to move through the baffle 32 to the combustor where they are suddenly heated to a predetermined temperature ranging upward to about 1500° F. After a predetermined residence time in the combustion chamber 20 at the high temperature required to transform the noxious gases into an impotent state, the hot gases are directed into the concentric outlet passageways 19 in heat exchange relation with the cool noxious gas entering the heat exchanger. Here the hot exhaust gases give up heat to the cool gases bearing the noxious gas before they are vented to the atmosphere as substantially odor-free gases.

While this invention has been described with reference to the embodiment illustarted in the drawing, it is evident that various changes may be made therein without departing from the spirit of the invention. It is therefore intended that all matter contained in the above description or shown in the accompanying drawings shall be interpreted as illustrative and not in a limiting sense.

I claim:

1. An odor elimination device for a gaseous medium containing an odoriferous constituent comprising a heat exchanger having a multiplicity of substantially concentric tubular members spaced apart to provide therebetween inlet and outlet passageways for the axial flow of said gaseous medium, housing means enclosing said tubular members, inlet and outlet ports at one end of said housing, said inlet port connected to the inlet passageway by manifold means that extends radially across the heat exchanger, and heater means within said housing axially spaced across said passageways from the inlet and outlet ports whereby said odor containing gaseous medium flowing through said housing from inlet to outlet ports is subjected to heat from said heater means sufficient to effect the transposition of said odoriferous constituent to an innocuous state.

2. An odor elimination device as defined in claim 1 wherein the concentric tubular members are provided with extended surface means that substantially increase the transfer of heat between fluids flowing through the passageways therebetween.

3. An odor elimination device as defined in claim 1 wherein said housing means is insulated to maintain the temperature within said housing in excess of the combustion temperature of said odoriferous constituent.

4. An odor elimination device as defined in claim 1 wherein said heater means is positioned adjacent ends of said inlet passageways for odor containing gaseous medium so as to increase the time said gaseous medium is subjected to heat from said heater means before it is exhausted through said outlet passageways and the outlet port.

5. An odor elimination device as defined in claim 1 including a catalytic bed intermediate the inlet and outlet passageways whereby said gaseous medium is directed therethrough before it is exhausted through said outlet passageways to the outlet port.

6. An odor eliminator device as defined in claim 1 wherein said heater means comprises a burner whose flame of combustion is supported by the gaseous medium entering the housing through the inlet port.

7. An odor eliminator deivce as defined in claim 1 whose concentric tubular members comprise cylindrical members having an undulated surface.

8. An odor elimination device as defined in claim 1 including means that increases the residence time of the odor containing gas medium intermediate said heater means and the outlet passageways.

9. An odor elimination device as defined in claim 1 wherein said heater means is positioned adjacent the wall of said housing.

References Cited

UNITED STATES PATENTS

| | | | |
|---|---|---|---|
| 2,845,882 | 8/1958 | Bratton | 110—8 |
| 2,962,987 | 12/1960 | Hebert et al. | 110—8 |
| 3,220,179 | 11/1965 | Bloomfield | 23—288.3 X |
| 3,224,842 | 12/1965 | Manske | 23—277 |

JOSEPH SCOVRONEK, Primary Examiner

U.S. Cl. X.R.

23—277; 219—201; 431—202